United States Patent
Matsuda et al.

(10) Patent No.: US 10,253,142 B2
(45) Date of Patent: Apr. 9, 2019

(54) EPOXY RESIN COMPOSITION AND FIBER REINFORCED COMPOSITE MATERIAL

(71) Applicant: TORAY INDUSTRIES, INC., Tokyo (JP)

(72) Inventors: Ayumi Matsuda, Ehime (JP); Masayuki Miyoshi, Ehime (JP); Noriyuki Hirano, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 4 days.

(21) Appl. No.: 15/519,983

(22) PCT Filed: Sep. 30, 2015

(86) PCT No.: PCT/JP2015/077644
§ 371 (c)(1),
(2) Date: Apr. 18, 2017

(87) PCT Pub. No.: WO2016/063692
PCT Pub. Date: Apr. 28, 2016

(65) Prior Publication Data
US 2017/0327652 A1    Nov. 16, 2017

(30) Foreign Application Priority Data

Oct. 21, 2014  (JP) ................. 2014-214160

(51) Int. Cl.
*B32B 27/38* (2006.01)
*B32B 27/26* (2006.01)
*B32B 27/04* (2006.01)
*C08J 5/24* (2006.01)
*C08L 63/00* (2006.01)
*C08G 59/32* (2006.01)
*C08G 59/38* (2006.01)
*C08G 59/50* (2006.01)
*C08J 5/04* (2006.01)
*C08G 59/24* (2006.01)
*C09J 163/00* (2006.01)

(52) U.S. Cl.
CPC ............ *C08J 5/042* (2013.01); *C08G 59/245* (2013.01); *C08G 59/3227* (2013.01); *C08G 59/38* (2013.01); *C08G 59/504* (2013.01); *C08G 59/5026* (2013.01); *C08G 59/5033* (2013.01); *C08J 5/04* (2013.01); *C08J 5/24* (2013.01); *C08J 2363/00* (2013.01); *C08J 2363/02* (2013.01)

(58) Field of Classification Search
None
See application file for complete search history.

(56) References Cited

U.S. PATENT DOCUMENTS

| | | | | |
|---|---|---|---|---|
| 4,528,305 A | * | 7/1985 | Henry ................ | C08G 59/5006 521/54 |
| 7,867,568 B2 | | 1/2011 | Hillermeier et al. | |
| 9,057,002 B2 | | 6/2015 | Padilla-Acevedo et al. | |
| 9,249,282 B2 | | 2/2016 | Meegan | |
| 2008/0108761 A1 | | 5/2008 | Kouchi et al. | |
| 2008/0200589 A1 | * | 8/2008 | Hubschmid ............ | C08L 53/00 523/436 |
| 2012/0035299 A1 | * | 2/2012 | Arai ...................... | C08G 59/28 523/427 |
| 2012/0328811 A1 | | 12/2012 | Patel et al. | |
| 2013/0225788 A1 | * | 8/2013 | Meegan ................ | C08G 59/38 528/408 |

FOREIGN PATENT DOCUMENTS

| | | |
|---|---|---|
| JP | 04348120 A | 12/1992 |
| JP | 06329763 A | 11/1994 |
| JP | 09235397 A | 9/1997 |
| JP | 11241230 A | 9/1999 |
| JP | 2001323046 A | 11/2001 |
| JP | 2008508113 A | 3/2008 |
| JP | 2008274083 A | 11/2008 |
| JP | 2009227907 A | 10/2009 |
| JP | 2009256583 A | 11/2009 |
| JP | 2010150311 A | 7/2010 |
| JP | 2014118576 A | 6/2014 |
| JP | 2014517126 A | 7/2014 |
| JP | 2014521824 A | 8/2014 |
| JP | 2015508125 A | 3/2015 |
| WO | 0053654 A1 | 9/2000 |
| WO | 03040206 A1 | 5/2003 |

OTHER PUBLICATIONS

International Search Report and Written Opinion for International Application No. PCT/JP2015/077644, dated Dec. 8, 2015, 5 pages.

* cited by examiner

*Primary Examiner* — Michael J Feely
(74) *Attorney, Agent, or Firm* — RatnerPrestia

(57) ABSTRACT

An epoxy resin composition is provided including at least the following component [A], component [B], and component [C] or [D] wherein cured product obtained by curing the epoxy resin composition has a rubbery state modulus in dynamic viscoelasticity evaluation of 10 MPa or less, and the cured product has a glass transition temperature of at least 95° C.;

[A] an aromatic epoxy resin having a functionality of at least 3,

[B] an aromatic diamine having a substituent at ortho position of each amino group or a cycloalkyldiamine wherein the carbon atom adjacent to the carbon atom bonded to each amino group has a substituent,

[C] an aliphatic polyamine having an alkylene glycol structure,

[D] a straight chain or branched aliphatic polyamine containing 6 to 12 carbon atoms.

12 Claims, No Drawings

EPOXY RESIN COMPOSITION AND FIBER REINFORCED COMPOSITE MATERIAL

CROSS REFERENCE TO RELATED APPLICATIONS

This is the U.S. National Phase application of PCT/JP2015/077644, filed Sep. 30, 2015, and claims priority to Japanese Patent Application No. 2014-214160, filed Oct. 21, 2014, the disclosures of each of these applications being incorporated herein by reference in their entireties for all purposes.

FIELD OF THE INVENTION

The present invention relates to an epoxy resin composition adapted for use as a matrix resin of a fiber reinforced composite material which is suitable for use in sport applications and general industrial applications. The present invention also relates to a fiber reinforced composite material prepared by using such epoxy resin composition for the matrix resin.

BACKGROUND OF THE INVENTION

Epoxy resins are popular resins used in various industries as a coating composition, adhesive, electric and electronic information material, advanced composite materials, and the like due to their excellent mechanical properties. More specifically, epoxy resins are widely used in fiber reinforced composite materials comprising a reinforcing fiber such as carbon fiber, glass fiber, aramid fiber, or the like and a matrix resin. Of the polyamines, acid anhydrides, imidazoles, and the like used for the curing agent in such epoxy resin, polyamine is the most widely used agent in the application of fiber reinforced composite materials since selection of the product adequate for the application is easy due to the wide variety of polyamine products.

The method used for the preparation of the fiber reinforced composite material may be adequately selected from prepreg method, hand lay-up method, filament winding method, pultrusion method, RTM (Resin Transfer Molding) method, and the like. The fiber reinforced composite material members obtained by such method exhibit excellent strength, and such members contribute for weight reduction of aircraft parts, sports gears, automobile parts, windmill blade, and the like. In the meanwhile, demand for the weight reduction is nowadays even higher in view of environmental concern, emission control of the greenhouse gas, and the like, and further increase in the strength of the fiber reinforced composite material is awaited.

One of the most popular way of increasing the strength of the fiber reinforced composite material is increasing the strength of the reinforcing fiber, and Patent Document 1 discloses a reinforcing fiber having a high tensile strength.

Patent Document 2 discloses a prepreg and its molded article having an improved tensile strength translation rate by controlling the balance between the tensile elongation at break and fracture toughness of the matrix resin. Patent Document 3 discloses an epoxy resin composition which can be used in producing a prepreg exhibiting excellent adhesion to honeycomb core and excellent tensile strength having a rigidity modulus of the rubbery flat part of 10 MPa or less.

Patent Documents 4 to 7 disclose an epoxy resin composition prepared by using a polyamine for the curing agent. This composition was prepared as an epoxy resin composition which can be used for the process such as filament winding method, pultrusion method, or RTM method.

Patent Document 4 discloses an epoxy resin composition comprising a particular epoxy resin containing an aromatic epoxy resin having a functionality of 3 or more and a liquid aromatic amine.

Patent Document 5 discloses an epoxy resin composition comprising an epoxy resin having a functionality of 3 or more and 2 types of curing agents having different reactivity, which is used for the continuous pultrusion method. Patent Document 5 also discloses polyamines used for the curing agent.

Patent Document 6 discloses a low viscosity epoxy resin composition comprising a particular bifunctional epoxy resin and an aromatic diamine curing agent.

Patent Document 7 discloses a liquid epoxy resin composition which is curable at a low temperature comprising an aliphatic or alicyclic amine and an aromatic amine.

Patent Document 8 discloses an epoxy resin composition having at least 2 types of exothermic peaks and use of two different curing agents for the curing agent.

Patent Document 9 discloses an epoxy resin composition containing 2 types of curing agents. It has discloses that a liquid curable component can be obtained by solvation of the second curing agent with a carrier, and that it further contains the component to be cured and an epoxy component.

PATENT DOCUMENTS

Patent Document 1: Japanese Unexamined Patent Publication (Kokai) No. HEI-11-241230

Patent Document 2: Japanese Unexamined Patent Publication (Kokai) No. HEI-9-235397

[Patent Document 3] Japanese Unexamined Patent Publication (Kokai) No. 2001-323046

[Patent Document 4] Japanese Unexamined Patent Publication (Kokai) No. 2009-227907

[Patent Document 5] Japanese Unexamined Patent Publication (Kokai) No. 2008-508113

[Patent Document 6] Japanese Unexamined Patent Publication (Kokai) No. 2010-150311

[Patent Document 7] Published Japanese Translation of PCT International Publication JP 2015-508125

[Patent Document 8] Published Japanese Translation of PCT International Publication JP 2014-521824

[Patent Document 9] Japanese Unexamined Patent Publication (Kokai) No. 2014-118576

SUMMARY OF THE INVENTION

The fiber reinforced composite material prepared by using the reinforcing fiber having the high tensile strength described in the Patent Document 1, however, suffered from increase in the cost despite its improvement in the strength, and therefore, it was unsuitable, in particular, for general industrial purpose.

The technique described in the Patent Document 2 involved increase of viscosity due to the large amount of thermoplastic resin and rubber components blended in the matrix resin. Accordingly, this technique cannot be used in the process using a liquid resin such as filament winding method, pultrusion method, and RTM method. The resin composition disclosed in Patent Document 3 is also the one having a high viscosity adapted for use in the preparation of a prepreg, and such composition cannot be used in the process involving use of a liquid resin. Furthermore, the fiber reinforced composite material suffered from insufficient tensile strength despite its high heat resistance.

While heat resistance was realized by using the epoxy resin composition having the low viscosity described in the Patent Document 4, tensile strength of the resulting fiber reinforced composite material was insufficient. In addition, in the epoxy resin composition of the Patent Document 5, the two types of polyamines disclosed are solely an aromatic polyamine and an alicyclic polyamine, and while heat resistance is realized by this epoxy resin composition, tensile strength of the fiber reinforced composite material is insufficient.

The epoxy resin compositions described in Patent Documents 6 to 9 are also insufficient in the tensile strength of the fiber reinforced composite material produced therefrom despite sufficient heat resistance.

In view of the situation as described above, an object of the present invention is to provide an epoxy resin composition which is adapted for use in a fiber reinforced composite material exhibiting good balance between the high heat resistance and the high tensile strength. Another object of the present invention is to provide a fiber reinforced composite material and a molded article prepared by using this epoxy resin composition.

In order to solve the problems as described above, the inventors of the present invention made an intensive study and found the epoxy resin composition having the following constitution. The present invention has been completed on the bases of this finding. More specifically, the epoxy resin composition of the present invention has the constitution as described below.

An epoxy resin composition comprising at least the following component [A], component [B], and component [C] or [D] wherein cured product obtained by curing the epoxy resin composition has a rubbery state modulus in dynamic viscoelasticity evaluation of 10 MPa or less, and the cured product has a glass transition temperature of at least 95° C.;

[A] an aromatic epoxy resin having a functionality of at least 3,

[B] an aromatic diamine having a substituent at ortho position of each amino group or a cycloalkyldiamine wherein the carbon atom adjacent to the carbon atom bonded to each amino group has a substituent,

[C] an aliphatic polyamine having an alkylene glycol structure,

[D] a straight chain or branched aliphatic polyamine containing 6 to 12 carbon atoms.

Use of the epoxy resin composition according to the present invention enables provision of a fiber reinforced composite material with high heat resistance and high tensile strength.

DETAILED DESCRIPTION OF EMBODIMENTS OF THE INVENTION

The epoxy resin composition of an embodiment of the present invention is constituted from at least the following component [A], component [B], and component [C] or [D].

[A] an aromatic epoxy resin having a functionality of at least 3,

[B] an aromatic diamine having a substituent at ortho position of each amino group or a cycloalkyldiamine wherein the carbon atom adjacent to the carbon atom bonded to each amino group has a substituent,

[C] an aliphatic polyamine having an alkylene glycol structure,

[D] a straight chain or branched aliphatic polyamine containing 6 to 12 carbon atoms.

The aromatic epoxy resin having a functionality of 3 or more which is the component [A] of the present invention is incorporated for improving the heat resistance of the cured product of the epoxy resin composition. Exemplary such epoxy resins include novolac epoxy resins such as phenol novolac epoxy resin and cresol novolac epoxy resin; biphenylaralkyl and xylok epoxy resins; and glycidyl amine epoxy resins such as N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-diaminodiphenylmethane, N,N,N',N'-tetraglycidyl-2,2'-diethyl-4,4'-methylenedianiline, and N,N,N',N'-tetraglycidyl-m-xylylenediamine. The preferred are the epoxy resins which are liquid at room temperature in view of improving impregnation into the reinforcing fiber.

The epoxy resin composition of the present invention may also contain epoxy resins other than the component [A] to the extent not adversely affecting the merits of the present invention.

Examples of such epoxy resin other than the component [A] include bisphenol A epoxy resin, bisphenol F epoxy resin, bisphenol S epoxy resin, biphenyl epoxy resin, naphthalene epoxy resin, epoxy resin having fluorene skeleton, diglycidyl resorcinol, glycidyl ether epoxy resin, N,N-diglycidyl aniline, and N,N-diglycidyl-o-toluidine, which may be used alone or in combination of two or more.

Among these, the preferred is use of an optionally substituted diglycidylaniline for the component [E]. Exemplary such epoxy resins include N,N-diglycidyl aniline and N,N-diglycidyl-o-toluidine.

The component [B] of an embodiment of the present invention is an aromatic diamine having a substituent at ortho position of each amino group or a cycloalkyldiamine wherein the carbon atom adjacent to the carbon atom bonded to each amino group has a substituent.

The diamine of the component [B] has a substituent near each of the 2 amino groups, and accordingly, the diamine is sterically hindered near the amino group which would be the reaction point. The 2 substituents may be either the same or different. Preferable substituent is an alkyl group containing 1 to 4 carbon atoms.

Examples of the aromatic diamine having a substituent at ortho position of each amino group include 2,6-diaminotoluene, diethyltoluenediamine, 4,4'-diamino-3,3'-diethyldiphenylmethane, 4,4'-diamino-3,3'-dimethyldiphenylmethane, 4,4'-diamino-3,3',5,5'-tetramethyldiphenylmethane, and 4,4'-diamino-3,3',5,5'-tetraethyldiphenylmethane.

An exemplary cycloalkyldiamine wherein the carbon atom adjacent to the carbon atom bonded to each amino group has a substituent is 2,2'-dimethyl-4,4'-methylenebiscyclohexylamine.

The aliphatic polyamine having an alkylene glycol structure which is the component [C] of the present invention and the straight chain or branched aliphatic polyamine containing 6 to 12 carbon atoms which is the component [D] of the present invention are incorporated as components having an excellent flexibility.

Examples of the alkylene glycol structure of the component [C] include polyoxyethylene, polyoxypropylene, and copolymer of polyoxyethylene and polyoxypropylene. Of such component [C], an aliphatic polyamine having amino group at its terminal is preferable in view of high reactivity with the epoxy resin, ease of being incorporated in the network with the epoxy resin, and improvement of the tensile strength translation rate of the fiber reinforced composite material. Examples of the aliphatic polyamine having amino group at the terminal include aliphatic polyamine having 2-aminopropyl ether structure, 2-aminoethyl ether structure, or 3-aminopropyl ether structure.

Exemplary commercially available aliphatic polyamines having 2-aminopropyl ether structure include "JEFFAMINE (Registered Trademark)" D-230, D-400, HK-511, and T-403 (all which are manufactured by Huntsman Japan), and an exemplary commercially available aliphatic polyamine having 2-aminoethyl ether structure is "JEFFAMINE (Registered Trademark)" EDR-148 (manufactured by Huntsman Japan). An exemplary commercially available aliphatic polyamine having 3-aminopropyl ether structure is "JEFFAMINE (Registered Trademark)" EDR-176 (manufactured by Huntsman Japan).

An exemplary commercially available aliphatic polyamine of the component [C] having no amino group at its terminal is "JEFFAMINE (Registered Trademark)" XTJ-568 (manufactured by Huntsman Japan).

Examples of the aliphatic polyamine of the component [D] include hexamethylenediamine, triethylenetetramine, tetraethylenepentamine, and trimethylhexamethylenediamine.

The aliphatic polyamines of the component [C] and [D] preferably have a molecular weight in the range of 100 to 600. The molecular weight of at least 100 facilitates realization of the merit of reducing the crosslinking density. The molecular weight of 600 or less suppresses decrease of the heat resistance.

Total amount of the components [B] and [C] or the components [B] and [D] is preferably the one such that active hydrogen group is 0.6 to 1.2 equivalents of the epoxy groups in all epoxy resin components in the epoxy resin composition. When the amount of the active hydrogen group is within such range, the cured resin product will be capable of realizing a fiber reinforced composite material having well balanced heat resistance and mechanical properties.

The epoxy resin composition of the present invention may contain a thermoplastic resin to the extent not adversely affecting the merit of the present invention. Exemplary such thermoplastic resins include the thermoplastic resin soluble in the epoxy resin and the organic particles such as rubber particles and thermoplastic resin particles.

Exemplary thermoplastic resins soluble in the epoxy resin include polyvinyl acetal resins such as polyvinyl formal and polyvinyl butyral, phenoxy resin, polyamide, polyimide, polyvinylpyrrolidone, and polysulfone.

Exemplary rubber particles include crosslinked rubber particles and core-shell rubber particles having a different type of polymer graft-polymerized on the surface of the crosslinked rubber particle.

The epoxy resin composition of the present invention is suitable for use in the fiber reinforced composite material produced by filament winding method or pultrusion method. In the filament winding method or pultrusion method, the reinforcing fiber bundle is passed through a resin tank filled with the epoxy resin composition to thereby impregnate the reinforcing fiber bundle with the epoxy resin composition.

In view of improving the impregnation in the reinforcing fiber bundle, the epoxy resin composition preferably has a low viscosity. More specifically, the viscosity at 25° C. is preferably 2000 mPa·s or less and more preferably 1600 mPa·s or less. The viscosity is measured in accordance with "Viscosity measurement method by cone and plate rotational viscometers" defined in JIS Z8803 (2011) using a type E viscometer (TVE-30H manufactured by Toki SANGYO) equipped with a standard cone rotor (1° 34'×R24) at a rotation speed of 10 rotations/minute and a temperature of 25° C. More specifically, the viscosity is the value obtained by preparing the epoxy resin composition, introducing the epoxy resin in the viscometer for use of the viscosity after 1 minute which is used as the initial viscosity. When the viscosity is in the above specified range, the epoxy resin composition can be impregnated in the reinforcing fiber with no need of special heating mechanism of the resin tank or dilution with an organic solvent.

In addition, since the reinforcing fiber bundle is continuously supplied, the epoxy resin composition should retain fluidity in the resin tank and therefore, the epoxy resin composition should have a long pot life. Change in the viscosity can be used as an index of the pot life. More specifically, the viscosity at 30° C. and after 30 minutes is up to 2 times of the original viscosity. The original viscosity is the value obtained 1 minute after the introduction of the epoxy resin composition prepared in the viscometer adjusted to 30° C., and when the value measured after 30 minutes (continuous measurement at 30° C.) is up to 2 times of the original viscosity, frequency of the epoxy resin change in the resin tank in the molding operation can be reduced with improved operation efficiency.

A fiber reinforced composite material having improved tensile strength translation rate can be produced when the rubbery state modulus obtained in the evaluation of dynamic viscoelasticity of the cured product obtained by curing the epoxy resin composition of the present invention is 10 MPa or less. The rubbery state modulus is preferably 9.0 MPa or less, and more preferably 8.5 MPa or less. This "rubbery state modulus" is an index which has correlation with the crosslinking density, and the rubbery state modulus will be generally low when the crosslinking density is low. The tensile strength translation rate is determined by [tensile strength of the fiber reinforced composite material/(strand strength of the reinforcing fiber×fiber volume fraction)×100], and a higher value of the tensile strength translation rate means higher utilization of the reinforcing fiber performance, and hence, a higher effect of reducing the weight.

In addition, a fiber reinforced composite material having excellent environmental resistance can be produced when the glass transition temperature of the cured product of the epoxy resin composition is at least 95° C. since loss of mechanical properties caused by strain and deformation of the fiber reinforced composite material by the ambient temperature at which the fiber reinforced composite material produced by using the epoxy resin composition is used will be suppressed. The glass transition temperature is preferably 105° C. or higher, and more preferably 115° C. or higher. The conditions used in the curing of the epoxy resin composition of the present invention are not particularly limited, and in typical production, the curing is conducted by heating the resin composition to a temperature of 100° C. for 2 hours and then conducing the heating at a temperature of 150° C. for 4 hours to thereby obtain the cured product.

In general, incorporation of the aromatic epoxy resin of the component [A] having a functionality of at least 3 results in the increase of crosslinking density, which in turn results in the increase of not only the heat resistance but also the rubbery state modulus. However, the present invention has for the first time revealed that, when the component [A] is combined with the amine of component [B] having the substituents near the amino groups and the aliphatic polyamine having an alkylene glycol structure which is the component [C] or the straight chain or branched aliphatic polyamine containing 6 to 12 carbon atoms which is the component [D] having the flexible skeleton, the rubbery state modulus can be reduced while retaining the excellent heat resistance. In other words, it is the combination of the components [A] and [B] in further combination with the components [C] or [D] that has enabled the production of the epoxy resin composition simultaneously exhibiting a low rubbery state modulus and an excellent heat resistance. In addition, use of this epoxy resin composition for the matrix resin enables production of a fiber reinforced composite material having excellent heat resistance and tensile strength.

The reason why the heat resistance and the tensile strength translation rate, namely, the reason why the heat resistance and the low rubbery state modulus are simultaneously realized by the combination of the components [A], [B], and [C] and the components [A], [B], and [D] is not clear. However, it has been estimated that steric hindrance caused by the substituent near each amino group of the component [B] interferes with the reaction with the component [A], and this results in the well-balanced inclusion of the cross-linking by the covalent bonding and restriction of the molecular chain by the steric hindrance in the cured product.

This effect is increased by the incorporation of the component [E]. In the cured product of the epoxy resin composition, the aromatic ring of the component [E] interferes with the molecular chain by causing steric hindrance, and movement of the molecular chain is thereby restricted. As a consequence, high heat resistance is realized even when the crosslinking density by the covalent bonding is low.

In order to obtain the epoxy resin composition having the low rubbery state modulus and the excellent heat resistance, the component [A] is preferably blended at an amount of 20 to 70 parts, and more preferably, at 30 to 50 parts by weight in relation to 100 parts by weight of all epoxy resins. In addition, the blend ratio of the component [B] and the component [C] or [D] is preferably in the range of 1:1 to 7:1, and more preferably in the range of 1:1 to 5:1. In the preparation of the epoxy resin composition of the present invention, the mixture may be kneaded by using a machine such as kneader, planetary mixer, three rolls, twin screw extruder, or the mixture may be manually kneaded by using, for example, a beaker and a spatula if uniform kneading is possible.

A fiber reinforced composite material containing the cured product of the epoxy resin composition of the present invention as the matrix resin can be produced by integrating and curing the epoxy resin composition of the present invention prepared by the method as described above with the reinforcing fiber.

The reinforcing fiber used in the present invention is not particularly limited, and exemplary fibers include glass fiber, carbon fiber, aramid fiber, boron fiber, alumina fiber, and silicon carbide fiber, which may be used alone or in combination of two or more. Of these, use of carbon fiber is preferable in view of obtaining a light-weight fiber reinforced composite material having a high rigidity.

The epoxy resin composition of the present invention is suitable for use in a process using a liquid resin, for example, filament winding method, pultrusion method, and RTM method. In view of adaptability for these processes, the epoxy resin composition of the present invention preferably has a viscosity at 25° C. of 2,000 mPa·s or less.

The fiber reinforced composite material produced from the epoxy resin composition of the present invention is suitable for use in pressure vessel, drive shaft, electric cable core material, structural body of mobile vehicle such as automobile, ship, and rail load carriage, and cables. The fiber reinforced composite material is most suited for the production of a pressure vessel by filament winding.

EXAMPLES

Next, the present invention is described in further detail by referring to Examples, which by no means limit the scope of the present invention.

The components used in the Examples are as described below.

<Materials Used>

Component [A]: Aromatic Epoxy Resin Having a Functionality of at Least 3

[A]-1 "ARALDITE (Registered Trademark)" MY0510 (N,N,O-triglycidyl-p-aminophenol manufactured by Huntsman Japan)

[A]-2 "ARALDITE (Registered Trademark)" MY721 (N,N,N',N'-tetraglycidyl-4,4'-diaminodiphenylmethane manufactured by Huntsman Japan)

[A]-3 "TETRAD (Registered Trademark)"-X (N,N,N',N'-tetraglycidyl-m-xylenediamine manufactured by MITSUBISHI GAS CHEMICAL COMPANY, INC.)

Component [B]:

(aromatic diamine having a substituent at ortho position of each amino group)

[B]-1 "Kayahard (Registered Trademark)" A-A (4,4'-diamino-3,3'-diethylphenylmethane manufactured by Nippon Kayaku Co., Ltd.)

[B]-2 "jERCURE (Registered Trademark)" W (diethyltoluenediamine manufactured by Mitsubishi Chemical Corporation)

[B]-3 2,6-diaminotoluene

[B]-4 "Lonzacure (Registered Trademark)" M-MIPA (3,3'-diisopropyl-5,5'-dimethyl-4,4'-diaminodiphenylmethane manufactured by Lonza)

(Cycloalkyldiamine wherein the carbon atom adjacent to the carbon atom bonded to each amino group has a substituent)

[B]-5 "Baxxodur (Registered Trademark)" EC331 (2,2'-dimethyl-4,4'-methylenebiscyclohexylamine manufactured by BASF Japan)

Component [C]: Aliphatic Polyamine Having Alkylene Glycol Structure (Aliphatic polyamine having 2-aminopropyl ether structure)

[C]-1 "JEFFAMINE (Registered Trademark)" D-230 (polypropylene glycol diamine manufactured by Huntsman Japan)

[C]-2 "JEFFAMINE (Registered Trademark)" D-400 (polypropylene glycol diamine manufactured by Huntsman Japan)

[C]-3 "JEFFAMINE (Registered Trademark)" T-403 (polypropylene glycol triamine manufactured by Huntsman Japan)

(Aliphatic polyamine having 2-aminoethyl ether structure)

[C]-4 "JEFFAMINE (Registered Trademark)" EDR-148 (1,8-diamino-3,6-dioxaoctane manufactured by Huntsman Japan) (Aliphatic polyamine having 3-aminopropyl ether structure)

[C]-5 "JEFFAMINE (Registered Trademark)" EDR-176 (1,10-diamino-4,7-dioxadecane manufactured by Huntsman Japan)

(Component [C] Other than Those as Described Above)

[C]-6 "JEFFAMINE (Registered Trademark)" XTJ-568 (polypropylene glycol diamine manufactured by Huntsman Japan)

Component [D]: A Straight Chain or Branched Aliphatic Polyamine Containing 6 to 12 Carbon Atoms

[D]-1 HMDA (hexamethylenediamine manufactured by Toray)

Component [E]: An Optionally Substituted Diglycidyl Aniline

[E]-1 GAN (N,N'-diglycidylaniline manufactured by Nippon Kayaku Co., Ltd.)

Epoxy Resin Other than the Components [A] and [E]

[A']-1 "jER (Registered Trademark)" 828 (liquid bisphenol A epoxy resin manufactured by Mitsubishi Chemical Corporation)

[A']-2 "jER (Registered Trademark)" 825 (liquid bisphenol A epoxy resin manufactured by Mitsubishi Chemical Corporation)

[A']-3 "jER (Registered Trademark)" 806 (liquid bisphenol F epoxy resin manufactured by Mitsubishi Chemical Corporation)

[A']-4 "OGSOL (Registered Trademark)" EG-200 (fluorene epoxy resin manufactured by Osaka Gas Chemicals Co., Ltd.)

[A']-5 "HyPox (Registered Trademark)" RA95 (elastomer-modified bisphenol A epoxy resin manufactured by CVC Specialty Chemicals)

Amine [F] Other than the Components [B], [C], and [D]

[F]-1 "Baxxodur (Registered Trademark)" EC201 (isophoronediamine manufactured by BASF Japan)

[F]-2 3,3'DAS (3,3'-diaminodiphenylsulfone manufactured by Mitsui Fine Chemicals, Inc.)

[F]-3 Seikacure-S (4,4'-diaminodiphenylsulfone manufactured by SEIKA Corporation)

[F]-4 4-aminodiphenylamine

[F]-5 diethylenetriamine

Other Components [G]

[G]-1 "Kane Ace (Registered Trademark)" MX-416 (core-shell rubber 25% by weight/"ARALDITE" MY721 (component [A]) 75% by weight manufactured by KANEKA CORPORATION)

[G]-2 DIC-TBC (4-t-butylcathecol, manufactured by DIC)

Reinforcing Fiber

"TORAYCA (Registered Trademark)" T700SC-12K-50C (manufactured by Toray having a tensile strength of 4.9 GPa)

<Preparation Method of the Epoxy Resin Composition>

The epoxy resin of the component [A] and other epoxy resins were introduced in a beaker, and the mixture was heated to a temperature of 80° C. Kneading was conducted for 30 minutes with heating. The temperature was then reduced to 30° C. or lower with the kneading continued, and the amines of the component [B] and the component [C] or [D] were added to the mixture. The mixture was stirred for 10 minutes to obtain the epoxy resin composition.

Compositional ratio in the Examples 1 to 18 and Comparative Examples 1 to 8 are shown in Tables 1 to 3.

<Measurement of Viscosity of Epoxy Resin Composition>

The viscosity of the epoxy resin composition prepared by the <Preparation method of the epoxy resin composition> as described above was measured by "Viscosity measurement method by cone and plate rotational viscometers" defined in JIS Z8803 (2011) by using a type E viscometer (TVE-30H manufactured by Toki SANGYO) equipped with a standard cone rotor (1° 34'×R24) at a rotation speed of 10 rotations/minute. More specifically, the epoxy resin composition was introduced in the viscometer adjusted to 25° C. or 30° C., and the viscosity after 1 minute was used as the initial viscosity.

<Preparation Method of the Fiber Reinforced Composite Material>

The carbon fiber "TORAYCA (Registered Trademark)" T700SC-12K-50C (manufactured by Toray) was aligned in one direction in the form of a sheet (unit weight 150 g/m$^2$), and the epoxy resin composition prepared according to the <Preparation method of the epoxy resin composition> as described above was impregnated in the sheet to obtain an epoxy resin-impregnated carbon fiber sheet. 8 such sheets were laminated so that the fiber direction would be the same, and the laminate was placed in a mold with the metal spacer adjusted to a thickness of 1 mm and heat curing was conducted by placing the mold in a press heated to 100° C. for 2 hours. The mold was then removed from the press, and further curing was conducted by heating the mold in an oven heated to 150° C. for 4 hours to produce a fiber reinforced composite material.

<Method for Evaluating the Cured Resin Product>

After degassed in vacuum, the epoxy resin composition was cured at a temperature of 100° C. for 2 hours in a mold adjusted to a thickness of 2 mm by a "Teflon (Registered Trademark)" spacer having a thickness of 2 mm. The curing was continued at a temperature of 150° C. for 4 hours to obtain a cured resin plate having a thickness of 2 mm. A test piece having a width of 12.7 mm and a length of 45 mm was cut out of this cured resin composition, and the glass transition temperature and the rubbery state modulus were read in the DMA measurement in the temperature range of 30 to 250° C. using a viscoelastometer (ARES manufactured by TA Instruments Japan Inc.) at a torsional vibration frequency of 1.0 Hz and temperature rise rate of 5.0° C./minute. The temperature at the intersection point of the tangential line of the glassy state and the tangential line of the transitional state in the storage modulus G' curve was used for the glass transition temperature. The rubbery state modulus is the storage modulus in the region where the storage modulus has become flat in the temperature range in excess of the glass transition temperature, and in the present invention, the storage modulus at a temperature 40° C. higher than the glass transition temperature is used for the rubbery state modulus.

<Tensile Strength Measurement of the Fiber Reinforced Composite Material>

A piece with the width of 12.7 mm and the length of 229 mm was cut out of the fiber reinforced composite material prepared according to the <Preparation method of the fiber reinforced composite material> as described above, and a glass fiber reinforced plastic tab of 1.2 mm×length of 50 mm was attached to both ends to prepare the test piece. Tensile strength was measured according to ASTM D 3039 by using Instron universal testing machine (manufactured by Instron) at a cross-head speed of 1.27 mm/min. Average of the value measured for 6 samples (n=6) was used for the tensile strength.

The tensile strength translation rate was calculated by:

Tensile strength translation rate=tensile strength of the fiber reinforced composite material/(strand strength of the reinforcing fiber×fiber volume fraction)×100

The value used for the fiber volume fraction was the value measured according to ASTM D 3171.

Example 1

The epoxy resin composition was prepared according to the <Preparation method of the epoxy resin composition> as described above by mixing 30 parts by weight of "ARALDITE (Registered trademark)" MY0510 as the component [A], 70 parts by weight of "jER (Registered Trademark)" 806 as the epoxy resin other than the component [A], 22.7 parts by weight of "jERCURE (Registered Trademark)" W as the component [B], and 22.7 parts by weight of "JEFFAMINE (Registered Trademark)" D-230 as the component [C]. The resulting epoxy resin composition had the initial viscosity at 25° C. of 1430 mPa·s, and the viscosity after 30 minutes at 30° C. did not exceed 2 times of the initial viscosity, demonstrating the good viscosity property of the composition.

This epoxy resin composition was cured by the method as described above to produce the cured product, and the cured product was evaluated for its dynamic viscoelasticity. The glass transition temperature was 111° C., and the rubbery state modulus was 9 MPa, and the heat resistance and the rubbery state modulus were favorable.

A fiber reinforced composite material was prepared from the epoxy resin composition according to the <Preparation method of the fiber reinforced composite material> to produce a fiber reinforced composite material having a fiber volume fraction of 65%. The tensile strength of the fiber reinforced composite material was calculated by the method as described above to calculate the tensile strength translation rate. The tensile strength translation rate was as high as 79%.

Example 2 to 18

Epoxy resin compositions, cured epoxy resins, and fiber reinforced composite materials were prepared by repeating the procedure of Example 1 except that the resin composition was changed as shown in Table 1 or 2. The resulting epoxy resin compositions all exhibited good viscosity property as in the case of Example 1. The resulting cured epoxy resin compositions exhibited good heat resistance and rubbery state modulus. The tensile strength translation rate of the resulting fiber reinforced composite material was also favorable.

Comparative Example 1

Epoxy resin composition and cured resin product were prepared by repeating the procedure of Example 1 except that the component [A] was not added. The resin composition and the evaluation results are shown in Table 3. The rubbery state modulus was favorable (10 MPa or less) while the heat resistance was insufficient with the glass transition temperature of 95° C. or less.

Comparative Example 2

Epoxy resin composition and cured resin product were prepared by repeating the procedure of Example 1 except that the component [B] was not added. The resin composition and the evaluation results are shown in Table 3. The rubbery state modulus was favorable (10 MPa or less) while the heat resistance was insufficient with the glass transition temperature of 95° C. or less.

Comparative Example 3

Epoxy resin composition and cured resin product were prepared by repeating the procedure of Example 1 except that the component [C] was not added. The resin composition and the evaluation results are shown in Table 3. The heat resistance was favorable with the glass transition temperature of at least 95° C. while the rubbery state modulus was not less than 10 MPa. A fiber reinforced composite material was prepared from the epoxy resin composition, and when a tensile test was conducted, the tensile strength translation rate was insufficient (68%).

Comparative Example 4

Epoxy resin composition and cured resin product were prepared by repeating the procedure of Example 1 except that the resin composition was changed as shown in Table 3. The solid amine was mixed with the epoxy resin after preliminarily dissolving in the liquid amine. The resin composition and the evaluation results are shown in Table 3. The heat resistance was favorable with the glass transition temperature of at least 95° C. while the rubbery state modulus was not less than 10 MPa. A fiber reinforced composite material was prepared from the epoxy resin composition, and when a tensile test was conducted, the tensile strength translation rate was insufficient (67%).

Comparative Example 5

Epoxy resin composition and cured resin product were prepared by repeating the procedure of Comparative Example 4 except that the resin composition was changed as shown in Table 3 (corresponding to the resin composition of the Example 3 of Published Japanese Translation of PCT International Publication JP 2008-508113). The resin composition and the evaluation results are shown in Table 3. The heat resistance was favorable with the glass transition temperature of at least 95° C. while the rubbery state modulus was not less than 10 MPa. A fiber reinforced composite material was prepared from the epoxy resin composition, and when a tensile test was conducted, the tensile strength translation rate was insufficient (70%).

Comparative Example 6

Epoxy resin composition and cured resin product were prepared by repeating the procedure of Example 1 except that the component [B] was not added and "Baxxodur (Registered Trademark)" EC201 was used for the amine. The resin composition and the evaluation results are shown in Table 3. The heat resistance was favorable with the glass transition temperature of at least 95° C. while the rubbery state modulus was not less than 10 MPa. A fiber reinforced composite material was prepared from the epoxy resin composition, and when a tensile test was conducted, the tensile strength translation rate was insufficient (63%).

Comparative Example 7

An epoxy resin composition and a cured resin product were prepared by referring the curing agent described in Example 1 of Patent Document 8 (Published Japanese Translation of PCT International Publication JP 2014-521824), and the epoxy resin composition and the cured resin product were prepared by repeating the procedure of Example 1 except that the amine used was diethylenetriamine and that the component [C] or [D] was not added. The resin composition and the evaluation results are shown in Table 3. The heat resistance was favorable with the glass transition temperature of at least 95° C. while the rubbery state modulus was not less than 10 MPa. A fiber reinforced composite material was prepared from the epoxy resin composition, and when a tensile test was conducted, the tensile strength translation rate was insufficient (70%).

Comparative Example 8

An epoxy resin composition and a cured resin product were prepared by repeating the procedure of Example 1 except that the resin composition was changed to the one described in Example 15 of Patent Document 6 (Japanese Unexamined Patent Publication (Kokai) No. 2010-150311). The resin composition and the evaluation results are shown in Table 3. The grass transition temperature was 95° C. or higher, the heat resistance was favorable, and the rubbery state modulus was higher than 10 MPa. A fiber reinforced composite material was prepared from the epoxy resin composition, and when a tensile test was conducted, the tensile strength translation rate was insufficient (68%).

Comparative Example 9

An epoxy resin composition was prepared according to the procedure described in Example 6 of Patent Document 3 (Japanese Unexamined Patent Publication (Kokai) No. 2001-323046). The evaluation results are shown in Table 4. The cured resin composition obtained by curing this composition had a high grass transition temperature of 173° C. while the rubbery state modulus was very high (18 MPa). This epoxy resin composition was extremely viscous, and the epoxy resin-impregnated carbon fiber sheet could not be prepared by the method described in the above <Preparation method of the fiber reinforced composite material>. Accordingly, the epoxy resin composition was dissolved in acetone, the thus prepared epoxy resin composition in liquid form was impregnated in carbon fiber. After drying at reduced pressure, acetone was removed by distillation to prepare epoxy resin-impregnated carbon fiber sheet. Then, a fiber reinforced composite material was prepared according to the procedure described above in the section of <Preparation method of the fiber reinforced composite material>, and when a tensile test was conducted, the tensile strength translation rate was insufficient (63%).

Comparative Example 10

An epoxy resin composition and a cured resin product were prepared by repeating the procedure of Example 1 except that the resin composition was changed to the one described in Example 2 of Patent Document 7 (Published Japanese Translation of PCT International Publication JP 2015-508125). The evaluation results are shown in Table 4. The grass transition temperature was 165° C., the heat resistance was favorable, while the rubbery state modulus was as high as 16 MPa. A fiber reinforced composite material was prepared from the epoxy resin composition, and when a tensile test was conducted, the tensile strength translation rate was insufficient (67%).

Comparative Example 11

An epoxy resin composition and a cured resin product were prepared by repeating the procedure of Example 1 except that the component to be cured was changed to the one having the composition described in Example 4 (Reference Example 4-1) of Patent Document 9 (Japanese Unexamined Patent Publication (Kokai) No. 2014-118576), and the epoxy component used was [A']-2. The evaluation results are shown in Table 4. The grass transition temperature was 141° C., the heat resistance was favorable, while the rubbery state modulus was as high as 14 MPa. A fiber reinforced composite material was prepared from the epoxy resin composition, and when a tensile test was conducted, the tensile strength translation rate was insufficient (69%).

TABLE 1

| Constitution | | Component | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Component [A] | "ARALDITE ®" MY0510 | N,N,O-triglycidyl-p-aminophenol | 30 | | | 50 | 30 | | 30 | 30 | |
| | "ARALDITE ®" MY721 | N,N,N',N'-tetra-glycidyl4,4'-diaminodiphenyl-methane | | 40 | | | | 50 | | | 40 |
| | "TETRAD ®"-X | N,N,N',N'-tetraglycidyl-m-xylenediamine | | | 50 | | | | | | |
| Component [E] | GAN | N,N'-diglycidylaniline | | | | | | | | 30 | 20 |
| Epoxy resin other than components [A] and [E] | "jER ®" 828 | liquid bisphenol A epoxy resin | | | | | | 50 | | | 40 |
| | "jER ®" 806 | liquid bisphenol F epoxy resin | 70 | 60 | 50 | 50 | 70 | | 40 | 40 | |
| | "OGSOL ®" EG-200 | fluorene epoxy resin | | | | | | | | 30 | |
| Component [B] | "Kayahard ®" A-A | 4,4'-diamino-3,3'-diethyldiphenylmethane | 22.7 | | | | | 27.0 | | 23.4 | |
| | "jERCURE ®" W | diethyltoluene diamine | | 23.3 | 23.2 | | | | | | 26.0 |
| | — | 2,6-diamino-toluene | | | | | 33.4 | | | | |
| | "Baxxodur ®" EC331 | 2,2'-dimethyl-4,4'-methylene-biscyclohexylamine | | | | 35.6 | | | 36.0 | | |
| Component [C] | "JEFFAMINE ®" D-230 | polypropylene glycol diamine | 22.7 | | | | | 18.0 | | | |
| | "JEFFAMINE ®" D-400 | polypropylene glycol diamine | | 23.3 | | | | | | | 17.3 |
| | "JEFFAMINE ®" T-403 | polypropylene glycol triamine | | | 23.2 | | | | | 23.4 | |
| | "JEFFAMINE ®" EDR-148 | 1,8-diamino-3,6-dioxaoctane | | | | | 35.6 | | | | |
| | "JEFFAMINE ®" EDR-176 | 1,10-diamino-4,7-dioxadecane | | | | 33.4 | | | 36.0 | | |

TABLE 1-continued

| Constitution | Component | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Resin properties | Viscosity | mPa · s | 1430 | 1555 | 1060 | 1320 | 1100 | 1820 | 752 | 2340 | 1480 |
| | Glass transition temperature | ° C. | 111 | 120 | 128 | 125 | 127 | 135 | 122 | 120 | 125 |
| | Rubbery state modulus | MPa | 8.8 | 9 | 9.5 | 9.5 | 9 | 10 | 7.5 | 7.2 | 7 |
| Properties of the fiber-reinforced composite material | tensile strength translation rate | % | 79 | 78 | 78 | 79 | 80 | 77 | 81 | 81 | 82 |

(The number of the component represents parts by weight.)

TABLE 2

| Constitution | Component | | | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|---|---|
| Component [A] | "ARALDITE ®" MY0510 | N,N,O-triglycidyl-p-aminophenol | | | | 30 | 30 | | 20 | | | | 20 |
| | "ARALDITE ®" MY721 | N,N,N',N'-tetra-glycidyl4,4'-diaminodiphenyl-methane | | 40 | | | 40 | | 10 | 80 | 20 | |
| Component [E] | GAN | N,N'-diglycidylaniline | | | | | 40 | | 30 | | | 30 | 40 |
| Epoxy resin other than component [A] and [E] | "jER ®" 828 | liquid bisphenol A epoxy resin | | 40 | | 30 | | | | 90 | | | 40 |
| | "jER ®" 806 | liquid bisphenol F epoxy resin | | | 70 | | 60 | 50 | | | 20 | 50 | |
| | "OGSOL ®" EG-200 | fluorene epoxy resin | | 20 | | | | | | | | | |
| Component [B] | "Kayahard ®" A-A | 4,4'-diamino-3,3'-diethyldiphenylmethane | | | 21.7 | | | | | 22.5 | | | 19.8 |
| | "jERCURE ®" W | diethyltoluene-diamine | | | | 31.0 | | | | | 23.6 | 20.1 | |
| | — | 2,6-diamino-toluene | | | | | | | | | | | |
| | "Baxxodur ®" EC331 | 2,2'-dimethyl-4,4'-methylene-biscyclohexylamine | | 25.4 | | | 14.5 | 34.1 | | | | | |
| Component [C] | "JEFFAMINE ®" D-230 | polypropylene glycol diamine | | | | | 6.2 | | 15 | | | | |
| | "JEFFAMINE ®" D-400 | polypropylene glycol diamine | | 25.4 | | | | | | | 35.4 | | |
| | "JEFFAMINE ®" EDR-148 | 1,8-diamino-3,6-dioxaoctane | | | | | | | 34.1 | | | | |
| | "JEFFAMINE ®" XTJ-568 | polypropylene glycol diamine | | | 21.7 | | | | | | | | |
| Component [D] | HMDA | hexamethylenediamine | | | | | | 14.5 | | | | 8.6 | 13.2 |
| Resin properties | Viscosity | mPa · s | | 2150 | 1510 | 980 | 1240 | 680 | 1640 | 1450 | 1030 | 1270 |
| | Glass transition temperature | ° C. | | 128 | 112 | 135 | 124 | 125 | 105 | 128 | 126 | 134 |
| | Rubbery state modulus | MPa | | 9 | 10 | 8.5 | 9.2 | 7.4 | 7.6 | 10 | 7.4 | 8.2 |
| Properties of the fiber-reinforced composite material | tensile strength translation rate | % | | 81 | 76 | 80 | 78 | 82 | 80 | 76 | 81 | 80 |

(The number of the component represents parts by weight.)

TABLE 3

| Constitution | Component | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|
| Component [A] | "ARALDITE ®" MY0510 | N,N,O-triglycidyl-p-aminophenol | | | | 40 | 10 | 25 | | 30 | |
| | "ARALDITE ®" MY721 | N,N,N',N'-tetra-glycidyl-4,4'-diamino-diphenylmethane | | | 50 | | 19 | 50 | 50 | | 50 |
| Epoxy resin other than component [A] | "jER ®" 828 | liquid bisphenol A epoxy resin | | | | | | | | 70 | |
| | "jER ®" 825 | liquid bisphenol A epoxy resin | | | | | | | | | 20 |
| | "jER ®" 806 | liquid bisphenol F epoxy resin | 100 | 50 | | 60 | 35 | | 50 | | |

TABLE 3-continued

| Constitution | Component | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|
| | GAN | N,N'-diglycidyl-aniline | | | | 15 | | | | 30 |
| | "HyPox ®" RA95 | elastomer-modified bisphenol A epoxy resin | | | | | | 25 | | |
| Component [B] | "Kayahard ®" A-A | 4,4'-diamino-3,3'-diethyldiphenylmethane | | | 52.3 | | | | | |
| | "jERCURE ®" W | diethyltoluene-diamine | 21.6 | | | | 27.1 | 30.0 | 19.6 | 22.8 |
| | "Lonzacure ®" M-MIPA | 3,3'-diisopropyl-5,5'-dimethyl-4,4'-diaminophenylmethane | | | | | | | | 22.8 |
| Component [C] | "JEFFAMINE ®" D-230 | polypropylene glycol diamine | | 45.0 | | | | | | |
| | "JEFFAMINE ®" D-400 | polypropylene glycol diamine | 14.4 | | | | | | 17.2 | |
| Amine other than components [B] and [C] | "Baxxodur ®" EC201 | isophorone diamine | | | | | | | 25.8 | |
| | 3,3'DAS | 3,3'-diamino-diphenylsulfone | | | | | 7.7 | 30.0 | | |
| | Seikacure-S | 4,4'-diamino-diphenylsulfone | | | | | 3.9 | | | |
| | — | 4-aminodiphenylamine | | | | | | 40.0 | | |
| | — | diethylene triamine | | | | | | | 4.9 | |
| Other components | "Kaneace ®" MX-416 | 25% by weight of core-shell rubber/75% by weight of "ARALDITE" MY721 (component [A]) | | | | | 28.0 | | | |
| | DIC-TBC | 4-t-butylcathecol | | | | | 1.0 | | | |
| Physical properties of the cured resin composition | Glass transition temperature | ° C. | 83 | 85 | 120 | 165 | 140 | 140 | 133 | 161 |
| | Rubbery state modulus | MPa | 7 | 8 | 14 | 15 | 14 | 20 | 13 | 14 |
| Properties of the fiber-reinforced composite material | tensile strength translation rate | % | — | — | 68 | 67 | 70 | 63 | 70 | 69 |

(The number of the component represents parts by weight.)

TABLE 4

| | | Comp. Ex. 9 | Comp. Ex. 10 | Comp. Ex. 11 |
|---|---|---|---|---|
| Physical property of the cured resin product | Glass transition temperature (° C.) | 173 | 165 | 141 |
| | Rubbery state modulus (MPa) | 18 | 16 | 14 |
| Properties of the fiber reinforced composite material | tensile strength translation rate (%) | 63 | 67 | 69 |

The epoxy resin composition of the present invention is well adapted for use in the preparation of a fiber reinforced composite material simultaneously exhibiting a high heat resistance and a high tensile strength translation rate. The epoxy resin composition and the fiber reinforced composite material of the present invention are suitable for use in sport applications, general industrial applications, and aerospace applications.

The invention claimed is:

1. An epoxy resin composition comprising at least components [A] and [B] and component [C] or [D] wherein cured product obtained by curing the epoxy resin composition has a rubbery state modulus in dynamic viscoelasticity evaluation of 10 MPa or less, and the cured product has a glass transition temperature of at least 95° C.;
    [A] an aromatic epoxy resin having a functionality of at least 3,
    [B] an aromatic diamine having a substituent at ortho position of each amino group or a cycloalkyldiamine wherein the carbon atom adjacent to the carbon atom bonded to each amino group has a substituent,
    [C] an aliphatic polyamine having an alkylene glycol structure,
    [D] a straight chain or branched aliphatic polyamine containing 6 to 12 carbon atoms;
    wherein component [B] and component [C] or [D] are present in a blend ratio in a range of 2:3 to 7:1.

2. An epoxy resin composition according to claim 1 wherein the component [B] is said aromatic diamine.

3. An epoxy resin composition according to claim 1 wherein the component [B] is said cycloalkyldiamine.

4. An epoxy resin composition according to claim 1 wherein the composition contains the component [C], and the component [C] is an aliphatic polyamine having 2-aminopropyl ether structure.

5. An epoxy resin composition according to claim 1 wherein the composition contains the component [C], and the component [C] is an aliphatic polyamine having 2-aminoethyl ether structure.

6. An epoxy resin composition according to claim 1 wherein the composition contains the component [C], and the component [C] is an aliphatic polyamine having aminopropyl ether structure.

7. An epoxy resin composition according to claim 1 wherein the composition further comprises a component [E] an optionally substituted diglycidylaniline.

8. An epoxy resin composition according to claim 1 wherein viscosity at 25° C. is 2000 mPa·s or less.

9. An epoxy resin composition according to claim 1 wherein the viscosity at 30° C. and after 30 minutes is up to 2 times of an original viscosity obtained 1 minute after introducing the epoxy resin composition in a viscometer being used to measure viscosity adjusted to 30° C.

10. A fiber reinforced composite material comprising a cured product of the epoxy resin composition according to claim 1 and a reinforcing fiber.

11. A molded article comprising the fiber reinforced composite material according to claim 10.

12. A pressure vessel comprising the fiber reinforced composite material according to claim 10.

* * * * *